United States Patent Office

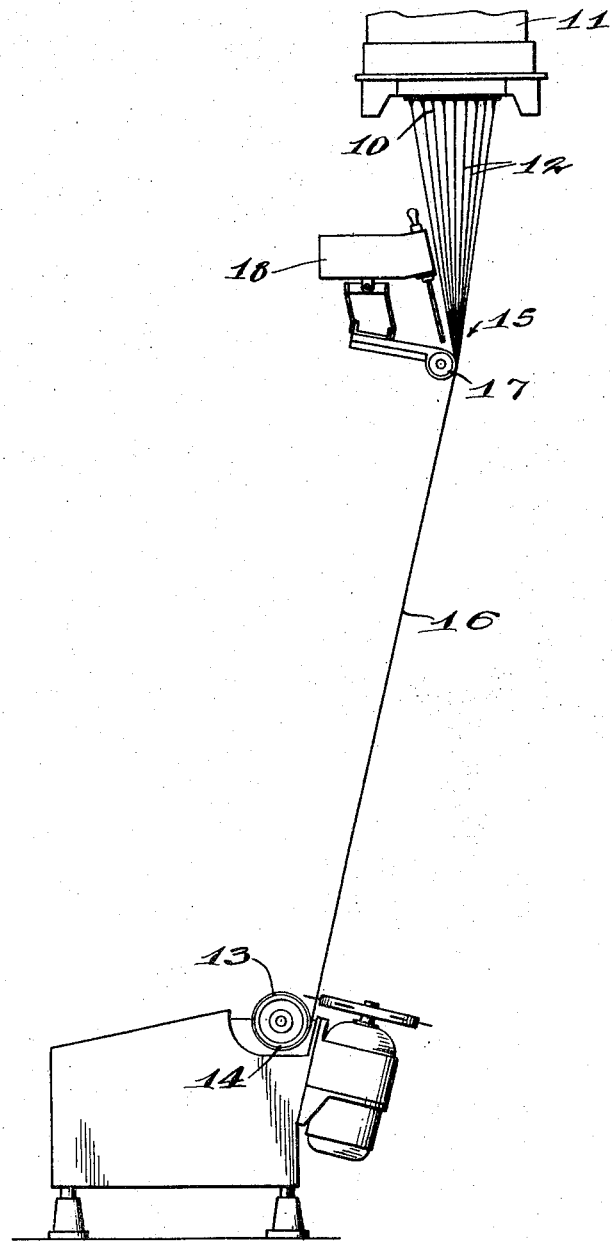
2,991,196
SIZED GLASS FIBER PRODUCTS
Filed Dec. 12, 1950
Inventor:
LAWRENCE P. BIEFELD.
By Staehin & Overman
Attorney

2,991,196
Patented July 4, 1961

2,991,196
SIZED GLASS FIBER PRODUCTS
Lawrence P. Biefeld, Granville, Ohio, assignor to Owens-Corning Fiberglas Corporation, a corporation of Delaware
Filed Dec. 12, 1950, Ser. No. 200,417
4 Claims. (Cl. 117—126)

This invention relates to the manufacture of sized glass fibers in filament, strand, yarn or other forms.

As employed in this invention, the size functions to prepare the fiber surfaces for a particular use while, at the same time, imparting the lubricity and bonding characteristics desired in strand formation.

An improperly lubricated fiber or strand is subject to mutual abrasion whereby the fibers may be quickly self destroyed. Unless properly lubricated, the filaments or strands also suffer from the abrasion caused by movement of the fibers through guides, machine elements or other processing parts.

This lubricating effect to separate the fibers and permit their relative movement without destruction should be balanced with the directly opposed action of a bonding agent that is applied to fix the plurality of filaments in a single strand. If the bundle of fibers or strand is not well bound together, filaments will separate from the strand or bundle when unwound from the drum and become intertangled with other filaments of adjacent strands until such confusion exists that the remainder of the drum must be discarded.

When the glass fibers are to be used for textiles and the like, a size formulated of starch, gelatin, dextrose and the like, with or without oily lubricant is satisfactory. However, when the glass fibers are to be employed in the manufacture of resinous coated fabrics or as a reinforcement for plastics, laminates or inorganic compositions such as cements, concrete or clay moldings, size of the type described is usually unsatisfactory. In fact, the presence of starchy, dextrose or gelatin materials on the glass fiber surfaces appears to hinder adhesion of resinous materials for the glass fiber surfaces and full utilization of the glass fibers for the purpose for which they were intended is not achieved.

It is an object of this invention to produce glass fibers in forming with a size adapted to make better use of the glass fibers as a base or reinforcement in resinous or inorganic compositions of the type described.

Another object is to treat glass fibers in forming with a size that is stable under operating conditions within a wide range of dilution in an aqueous system, which will not cause dermatitis when present on the glass fiber surfaces, and which is formulated of simple low cost materials available in abundant supply.

These and other objects and advantages of this invention will hereinafter appear, and for purposes of illustration but not of limitation, an embodiment for sizing glass fibers in accordance with the practice of this invention is shown in the accompanying drawing.

In accordance with this invention, glass fibers are sized in forming with an aqueous composition containing 1.0–10.0 percent by weight butadiene-styrene copolymer and 0.2–2 percent by weight of a lubricant. In the absence of the lubricant in the size composition, the strands would not form well and difficulties would be occasioned in the processing of the filaments in strand formation.

The butadiene-styrene copolymer is preferably selected of compositions formed of 60–70 parts styrene to 40–30 parts by weight butadiene, although formulations with higher ratios of butadiene can be used. These are usually employed as a latex which can be diluted with water to a wide range of solids content without disturbing the stability of the emulsion or dispersion in the processing equipment.

Exceptional characteristics are secured when the lubricant used in combination with the butadiene-styrene copolymer comprises an unsaturated fatty acid amine having more than eight carbon atoms and preferably between 8–12 carbon atoms with unsaturated carbon to carbon linkages. Representative of lubricants of the type described are the amines of monoethylenic acids such as octenoic acids, decenoic acids, undecenoic acids, tridecenoic acids, hexadecenoic acids and the octadecenoic acids which include oleic acid, elaidic acid, and docosenoic acids; dienoic acids such as octadecadienoic acids which include linoleic acid; trienoic acids such as octadecatrienoic acids such as linolenic and eleostearic acids, and other polyethenoic acids such as clupanodonic acid, moroctic acid, stearidonic acid, hiragonic acid and the like acids having up to 26 carbon atoms.

Corresponding lubricating characteristics without hindrance of the bond between the glass fiber surfaces and the resinous or inorganic molding or coating compound with which they are to be used may be achieved when the corresponding unsaturated fatty acids of 8–26 carbon atoms comprise the acido group of Werner complex compounds wherein the acid group of the type described is coordinated with a trivalent nuclear chromium atom or other corresponding base atom.

The unsaturated group of the acid amine or the Werner complex compound may be found in an unsaturated side group such as in a methallyl group forming a part of the fatty acid amine.

By way of further lubricants, use may also be made of the salts, such as the quaternary onium salts or cationic active salts of unsaturated amines having more than eight carbon atoms such as of the amines described in the Sloan Patent No. 2,356,542.

Other lubricants may be used, such for example as the amines, cationic active onium compounds and Werner complex compounds formulated with saturated fatty acids having from 8–26 carbon atoms, but the adhesion between the material with which the fibers are to be used and the fiber surfaces is not as great as that secured when the acid group is unsaturated. Representative fatty acids include octanoic acid, decanoic acid, hexadecanoic acid which includes palmitic acid, heptadecanoic acid which includes margaric acid, octodecanoic acid which includes stearic acid, docosanoic acid (behenic acid) and the like.

Satisfactory use can also be made of esters having a large number of carbon atoms in chain-like arrangement such as dioctyl sebacate.

Suitable compositions which may be used in the practice of this invention are hereinafter set forth by way of illustration, but not by way of limitation. It will be understood that such compositions usually are applied to the glass filaments in connection with their forming operation, as will hereinafter be set forth. Instead of sizing the fibers in forming, the concepts of this invention may be practiced by the application of the size to formed fibers from which the original size has or has not been removed from the formed glass fiber surfaces, as by a water wash or by burning the size off the glass fiber surfaces in a heat cleaning process.

EXAMPLE 1

5.0 percent by weight butadiene-styrene copolymer in aqueous dispersion (X512 Latex-Dow Chemical Company)
0.25 percent fatty acid amine (having methallyl group in the amine)
94.75 percent water

EXAMPLE 2

3.0 percent butadiene-styrene copolymer (in aqueous dispersion)
1.0 percent by weight dioctyl sebacate
96.0 percent by weight water

EXAMPLE 3

6.0 percent butadiene-styrene copolymer (60–70 parts by weight styrene to 40–40 parts by weight butadiene)
1.5 percent decanoic acid amine
92.5 percent water

EXAMPLE 4

4.0 percent butadiene-styrene copolymer in aqueous emulsion
0.5 percent trimethyl dodecyl ammonium chloride
95.5 percent water

EXAMPLE 5

3.0 percent butadiene-styrene copolymer
0.7 percent Werner complex compound in which the acido group comprises linoleic acid
96.3 percent water Continuous glass fibers of the type employed in this invention are formed by the rapid attenuation of molten streams of glass. As shown in the drawing, the streams 10 of glass issue continuously from a number of orifices in the underside of a glass melting pot or bushing 11. The streams 10 are almost immediately attenuated into fine glass filaments 12 by means of a winding spindle 13 on which the filaments are wound into a package 14.

As the plurality of molten streams of glass are attenuated, the fine glass filaments that are formed are led over the guide 15 which groups the filaments into strand formation 16. The size is applied by roller 17 which forms a part of the guide. The roller or guide is fed from the supply tank 18. Instead of a roller, the guide may be provided with a pad which wipes the size onto the filaments as they pass therethrough.

The size is fed to the applicator at a constant rate calculated to be sufficient to provide for a solid content of about 1–5 percent by weight on the glass fiber surfaces after the diluent has been removed. It is possible to accelerate evaporation of the water diluent by circulation of warm air about the sized fibers, but more often, normal evaporation at room conditions is the practice.

Fibers sized in accordance with this invention enjoy marked superiority as a resinous reinforcement in plastics and laminates when compared to fibers sized with the usual gelatin, starch or dextrose compositions. Vast improvement is even shown over fibers which have been specially sized for the purpose of adapting the fibers for use with resinous materials. The following table compares glass fibers treated with the composition of Example 1, with fibers which have been specially sized with a composition based on a plasticized polyvinyl acetate and a chrome complex compound lubricant, hereinafter referred to as composition A. The fibers were processed in an identical manner in the manufacture of mat with phenol-formaldehyde resin. The figures are for flexure strength in pounds per square inch.

Test results on mat

| Size | Composition A | Example 1 |
| --- | --- | --- |
| Conditioned 7 days at 77° F., 50 percent relative humidity | 21,800 | 29,960 |
| Submerged in distilled water for 7 days at 170° F | 12,740 | 17,320 |
| Submerged in detergent for 7 days at 170° F | 10,580 | 16,840 |

It will be apparent from the above that under conditions which have been highly unfavorable to glass fiber products, glass fibers which have been treated in accordance with this invention are able to function much better in the purpose for which they were intended—that is as a strengthening agent for resinous materials.

Corresponding improvement is also secured when fibers sized in accordance with this invention are used with other resinous coatings, such as urea-formaldehyde, phenol-formaldehyde, melamine-formaldehyde and furfuryl alcohol resins. By far the greater advantage is derived when the resinous material is of the type which is formed with a monomer having unsaturated carbon to carbon linkages capable of addition polymerization, then bonding or orientation can take place between the copolymer of the size and the resinous material and the unsaturated group of the lubricant will further such unification in contrast to the effect of materials presently employed. Representative of such resinous materials are polystyrene, the vinyl polymers and copolymers such as polyvinyl chloride, polyvinyl acetate, polyvinyl acetal, vinyl chloride-vinyl acetate copolymer and polyvinylidene chloride, polyethylene, polybutylene, polychlorotrifluoroethylene, polyacrylates such as methyl methacrylate, ethyl methacrylate, ethyl acrylate and the like, butadiene-acrylonitrile copolymer. Beneficial use is also had with cellulose ethers and esters such as cellulose acetate, ethyl cellulose, nitrocellulose and the like.

It has also been found that fibers treated in accordance with this invention may be used to marked advantage as a reinforcement with gypsum and magnesium cements.

It will be understood that various modifications may be made in the method of application and treatment as well as in the concentrations employed without departing from the spirit of the invention, especially as defined in the following claims.

What is claimed is:

1. Glass fibers having a thin film on the surfaces thereof in the form of a size with a butadiene-styrene copolymer in admixture with a cationic amine lubricant having an organic group attached directly to the basic nitrogen atom containing more than 8 carbon atoms and an unsaturated carbon to carbon linkage.

2. A fibrous structure comprising glass fibers coated with a resinous material of the type having an unsaturated carbon to carbon linkage in a monomer of which it is formed and a size on the glass fiber surfaces comprising a butadiene-styrene copolymer in admixture with a lubricant selected from a fatty acid amine in which more than 8 carbon atoms are present and arranged with an unsaturated carbon to carbon linkage and present in the ratio of 1–10 parts by weight of the butadiene-styrene copolymer to 0.2–2.0 parts by weight of the lubricant.

3. A fibrous structure comprising glass fibers coated with a resinous material of the type having an unsaturated carbon to carbon linkage in a monomer of which it is formed and a size on the glass fiber surfaces comprising a butadiene-styrene copolymer in admixture with a lubricant selected from a cationic active amine having more than eight carbon atoms arranged in an alkyl group with unsaturation between carbon atoms and present in the ratio of 1–10 parts by weight butadiene-styrene copolymer to 0.2–2.0 parts by weight lubricant.

4. Continuous glass fibers sized in forming to provide a thin film on the glass fiber surfaces with 1–5 percent by weight of a composition containing in admixture 1–10 parts by weight of a butadiene-styrene copolymer formulated of 60–70 parts by weight styrene and 40–30 parts by weight butadiene and 0.2–2.0 parts by weight of a lubricant selected of a fatty acid amine in which the alkyl group is unsaturated in a carbon to carbon linkage and has more than 8 carbon atoms.

References Cited in the file of this patent

UNITED STATES PATENTS 2,273,040    Iler             Feb. 17, 1942

(Other references on following page)

UNITED STATES PATENTS

| | | |
|---|---|---|
| 2,356,542 | Sloan | Aug. 22, 1944 |
| 2,392,805 | Biefield | Jan. 15, 1946 |
| 2,446,119 | White | July 27, 1948 |
| 2,459,742 | Bradley et al. | Jan. 18, 1949 |
| 2,468,086 | Latham et al. | Apr. 26, 1949 |
| 2,513,268 | Steinman | June 27, 1950 |
| 2,523,759 | Grant | Sept. 26, 1950 |
| 2,544,667 | Goebel et al. | Mar. 13, 1951 |
| 2,549,220 | McLaren | Apr. 17, 1951 |
| 2,552,910 | Steinman | May 15, 1951 |
| 2,567,135 | Sturges et al. | Sept. 4, 1951 |
| 2,673,823 | Biefeld et al. | Mar. 30, 1954 |

FOREIGN PATENTS

| | | |
|---|---|---|
| 590,698 | Great Britain | July 25, 1947 |